United States Patent
Sathe et al.

(10) Patent No.: US 11,868,230 B2
(45) Date of Patent: Jan. 9, 2024

(54) AUTOMATED UNSUPERVISED MACHINE LEARNING UTILIZING META-LEARNING

(71) Applicant: International Business Machines Corporation, Armonk, NY (US)

(72) Inventors: Saket K. Sathe, Armonk, NY (US); Long Vu, Chappaqua, NY (US); Peter Daniel Kirchner, Putnam Valley, NY (US); Horst Cornelius Samulowitz, Armonk, NY (US)

(73) Assignee: International Business Machines Corporation, Armonk, NY (US)

(*) Notice: Subject to any disclaimer, the term of this patent is extended or adjusted under 35 U.S.C. 154(b) by 55 days.

(21) Appl. No.: 17/692,268

(22) Filed: Mar. 11, 2022

(65) Prior Publication Data

US 2023/0289277 A1 Sep. 14, 2023

(51) Int. Cl.
*G06F 11/34* (2006.01)
*G06N 20/00* (2019.01)

(52) U.S. Cl.
CPC ...... *G06F 11/3452* (2013.01); *G06F 11/3428* (2013.01); *G06N 20/00* (2019.01)

(58) Field of Classification Search
CPC .. G06F 11/3428; G06F 11/3452; G06N 20/00
USPC ......................................................... 702/186
See application file for complete search history.

(56) References Cited

U.S. PATENT DOCUMENTS

| | | | |
|---|---|---|---|
| 10,168,691 B2 | 1/2019 | Zornio | |
| 11,544,494 B2* | 1/2023 | Agrawal | G06F 18/214 |
| 11,620,568 B2* | 4/2023 | Moghadam | G06N 3/045 |
| | | | 706/12 |
| 2019/0303795 A1* | 10/2019 | Khiari | G06N 5/01 |
| 2020/0226490 A1 | 7/2020 | Abdulaal | |
| 2020/0272112 A1 | 8/2020 | Carullo | |
| 2020/0272947 A1 | 8/2020 | Carullo | |
| 2021/0081941 A1* | 3/2021 | Pearson | G06Q 20/4015 |
| 2021/0117232 A1 | 4/2021 | Sriharsha | |
| 2021/0117857 A1 | 4/2021 | Sriharsha | |
| 2021/0390466 A1* | 12/2021 | Varadarajan | G06N 5/043 |
| 2022/0044078 A1* | 2/2022 | Sathe | G06V 10/945 |

(Continued)

FOREIGN PATENT DOCUMENTS

| | | |
|---|---|---|
| CN | 110324569 B | 3/2021 |
| EP | 3779806 A1 | 2/2021 |
| KR | 102018330 B1 | 9/2019 |

OTHER PUBLICATIONS

"autoai / optus-opt", GitHub, dowloaded from the Internet on Feb. 17, 2022, 2 pages, <https://github.ibm.com/autoai/optus-opt>.

(Continued)

*Primary Examiner* — John H Le
(74) *Attorney, Agent, or Firm* — Aaron N. Pontikos

(57) ABSTRACT

Computer hardware and/or software that performs the following operations: (i) assessing a performance of a plurality of unsupervised machine learning pipelines against a plurality of data sets; (ii) associating the performance with meta-features corresponding to respective pipeline/data set combinations; (iii) training a supervised meta-learning model using the associated performance and meta-features as training data; and (iv) utilizing the trained model to identify one or more pipelines for processing an input data set.

20 Claims, 7 Drawing Sheets

(56) References Cited

U.S. PATENT DOCUMENTS

2022/0207163 A1\* 6/2022 Gentleman ......... G06F 21/6218
2022/0343207 A1\* 10/2022 Vu ........................... G06N 5/04

OTHER PUBLICATIONS

"Auto-Sklearn", AutoML.org, Freiburg-Hannover, downloaded from the Internet on Feb. 17, 2022, 2 pages, <https://www.automl.org/automl/auto-sklearn/>.

"yzhao062 / MetaOD", GitHub, downloaded from the Internet on Feb. 17, 2022, 11 pages, <https://github.com/yzhao062/MetaOD>.

Feuer et al., "Auto-Sklearn 2.0: Hands-free AutoML via Meta-Learning", arXiv:2007.04074v2 [cs.LG] Sep. 2, 2021, 56 pages.

Yoo et al., "Ensemble Squared: A Meta AutoML System", arXiv:2012.05390v3 [cs.LG] Jun. 19, 2021, 10 pages.

Zhao et al., "Automating Outlier Detection via Meta-Learning", arXiv:2009.10606v2 [cs.LG] Mar. 17, 2021, 21 pages.

\* cited by examiner

802

| Attributes | Statistics |
|---|---|
| Number of Datasets | 181 |
| Number of Pipelines | 282 |
| Experiments | 51,038 |

804

| Approach | Regret (lower better) | Median ROC (higher better) |
|---|---|---|
| Random | 26.83 % | 62.54 % |
| Avg. Best Pipelines | 18.78 % | 70.58 % |
| Meta OD [1] | 27.27 % | 58.28 % |
| OPTUS (Rank Correlation Maps Based) | 13.56 % | 80.35 % |

FIG. 8

AUTOMATED UNSUPERVISED MACHINE LEARNING UTILIZING META-LEARNING

BACKGROUND

The present invention relates generally to the field of machine learning, and more particularly to automated machine learning and meta learning.

Automated machine learning (AutoML) is the process of automating the application of machine learning to various problems and/or domains. Meta learning, on the other hand, involves using various automated learning algorithms on meta data of machine learning experiments themselves, where it is possible to learn, select, alter, and/or combine different learning algorithms to address various learning-related problems.

SUMMARY

According to an aspect of the present invention, there is a method, computer program product and/or system that performs the following operations (not necessarily in the following order): (i) assessing a performance of a plurality of unsupervised machine learning pipelines against a plurality of data sets; (ii) associating the performance with meta-features corresponding to respective pipeline/data set combinations; (iii) training a supervised meta-learning model using the associated performance and meta-features as training data; and (iv) utilizing the trained model to identify one or more pipelines for processing an input data set.

BRIEF DESCRIPTION OF THE DRAWINGS

FIG. 8 is a table view depicting experimental data according to an embodiment of the present invention.

DETAILED DESCRIPTION

Figure 1:
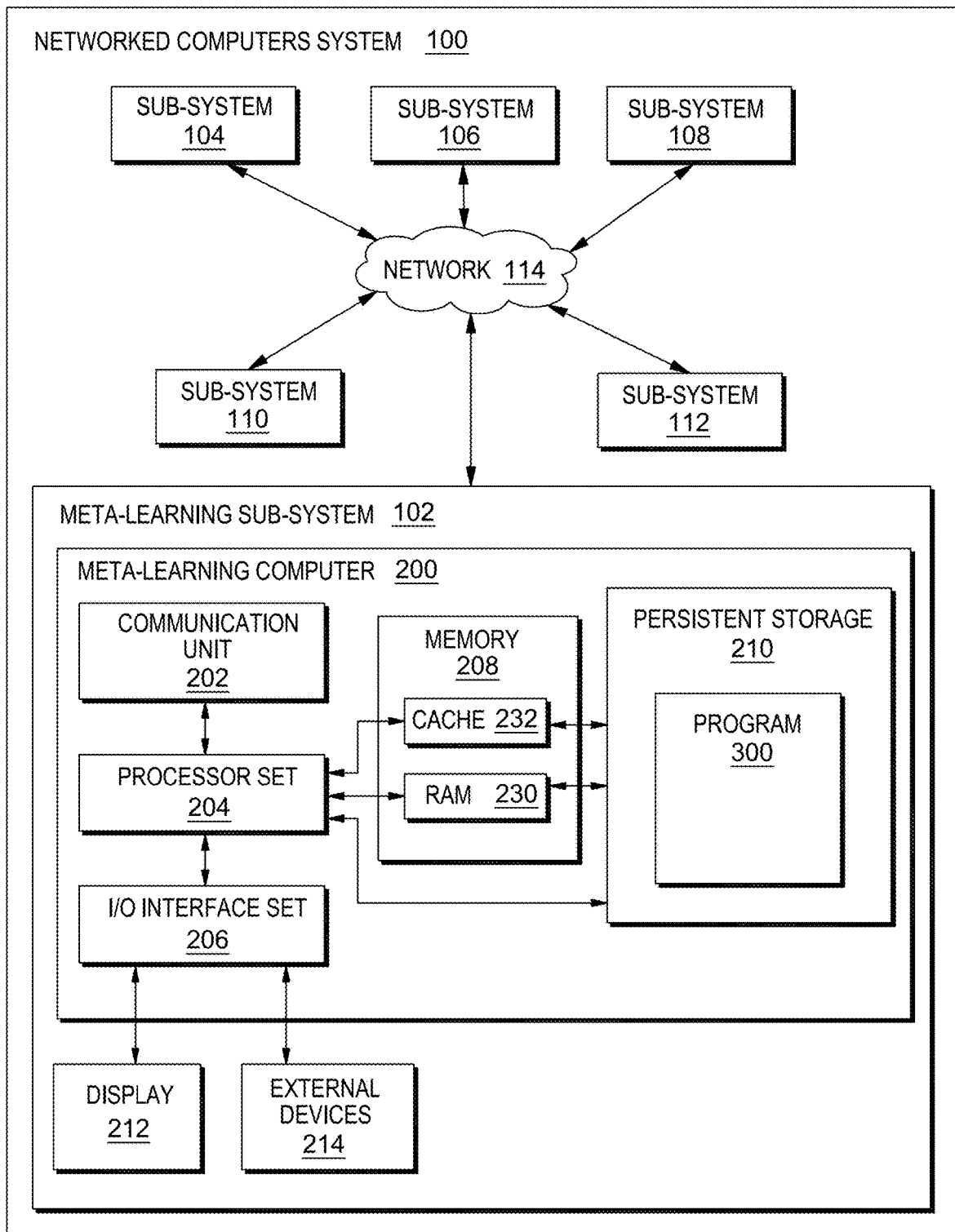
FIG. 1 is a block diagram view of a first embodiment of a system according to the present invention.

A common problem in automated machine learning (AutoML) is finding an optimal machine learning (ML) pipeline for a particular input data set. This problem becomes even more difficult in unsupervised environments where no data labels are available to tune hyperparameters and otherwise configure an ML model. Various embodiments of the present invention solve this problem by utilizing known supervised training data and a meta learning-based approach to train a model to identify one or more pipelines for processing a previously unknown input data set. In this way, as will be discussed in further detail below, various embodiments of the present invention improve upon prior solutions that, for example, utilize single, fixed pipelines or identify pipelines via conventional text matching or other known methods.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: meta-learning sub-system 102; sub-systems 104, 106, 108, 110, 112; communication network 114; meta-learning computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
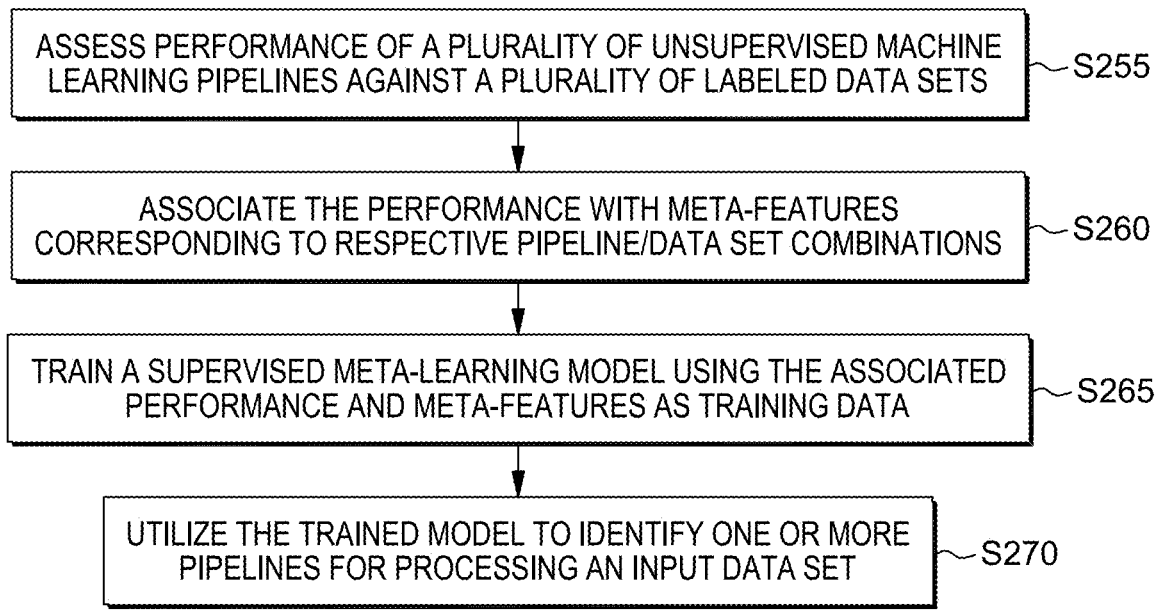
FIG. 2 is a flowchart showing a first embodiment method performed, at least in part, by the first embodiment system.
Figure 3:
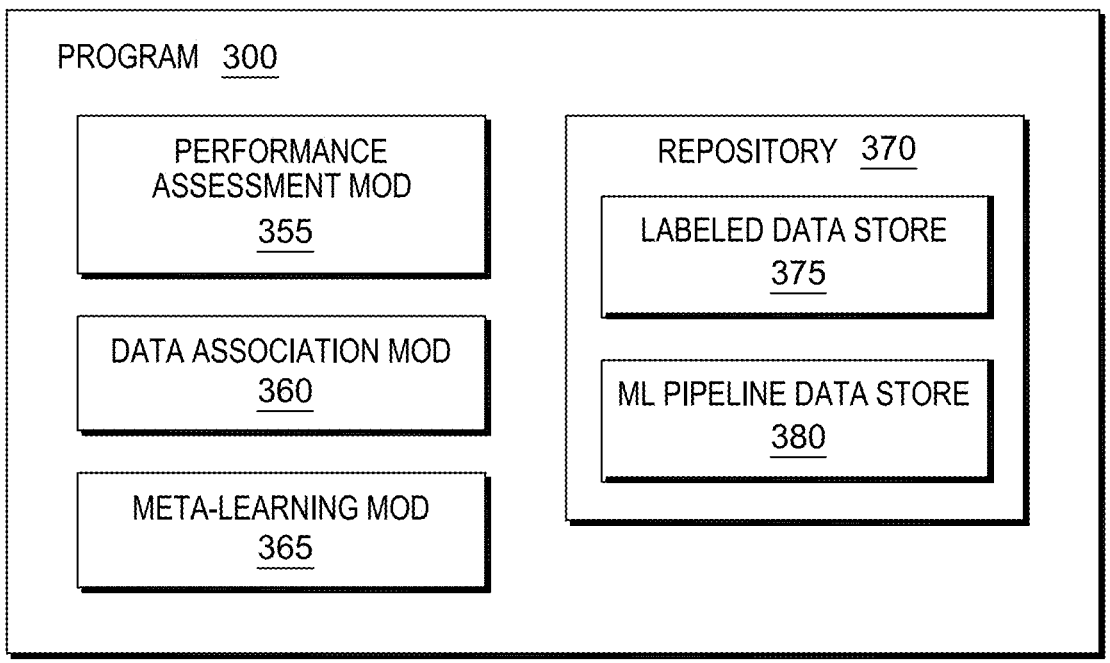
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and/or the like), program 300 of meta-learning sub-system 102 utilizes meta-learning to identify one or more machine learning (ML) pipelines to process an input data set. In this embodiment, the input data set is received from one of sub-system 104, sub-system 106, sub-system 108, sub-system 110, and sub-system 112 of networked computers system 100. In order to identify the appropriate pipeline(s) for processing the input data set, program 300 trains a meta-learning model (also referred to as a "meta-learning algorithm" or a "meta learner") using known, labeled data sets.

The ML pipelines (or simply, the "pipelines") used in this embodiment are received from ML pipeline data store 380 of repository 370 and respectively include multiple stages of unsupervised (i.e., unlabeled) ML processing, often culminating in a machine learning estimation stage. For example, as discussed below in the Further Comments and/or Embodiments sub-section, some ML pipelines include an imputation stage, a scaling stage, a feature engineering stage, and an estimator stage. Other pipelines of varying lengths/stages may also be utilized, with the general requirement being that each pipeline, as a whole, should be able to perform at least some ML processing without labels for training. The pipelines of this and other embodiments may be configured in a wide variety of ways, with a wide variety of hyperparameters, data transformers, estimators, and/or the like.

In the present embodiment, the pipelines are configured to identify outliers in data sets. In other embodiments, a wide variety of other unsupervised pipeline tasks may be utilized, including those now known and those yet to be known in the future. For example, some embodiments utilize clustering pipelines that operate without data labels (or cluster IDs) in unseen/new input data sets from users.

The labeled data sets used in this embodiment are retrieved from labeled data store 375 of repository 370 and generally include data and corresponding labels (or "annotations") for the data. The data sets may include well known, publicly available datasets, such as those discussed below in the Further Comments and/or Embodiments sub-section, below, and/or privately held data sets, as are known (or yet to be known) in the art.

Processing begins at operation S255 (see FIG. 2), where performance assessment mod 355 (see FIG. 3) assesses the performance of a plurality of unsupervised machine learning pipelines against a plurality of labeled data sets. In this operation, mod 355 processes the labeled data sets using the unsupervised machine learning pipelines, thereby generating predictions for the data of the labeled data sets, and then compares the predictions to the labels for the data to determine how well each pipeline performed. In many cases, as many combinations of pipelines and data sets are assessed as possible, in order to maximize the amount of available data for training the meta-learning algorithm or meta learner. In other embodiments, particularly where training resources may be limited, various methods for selecting certain combinations over others are utilized. Further, it should be noted that in various cases different configurations of a single pipeline (e.g., a single pipeline configured with different hyperparameters) may be represented as separate pipelines in order to independently utilize and/or test the different respective configurations.

The assessed performance can be represented using any of a wide variety of metrics for comparing predicted values to actual values, including those now known and those to be developed in the future. In the present example embodiment, and in various other embodiments of the present invention, a receiver operating characteristics (ROC) curve, illustrating the diagnostic ability of a classifier system as its discrimination threshold is varied, is utilized.

Processing proceeds to operation S260, where data association mod 360 associates the assessed performance with meta-features corresponding to respective pipeline/data set combinations. In some cases, mod 360 labels the meta-features of respective pipeline/data set combinations with an indicator of whether the respective pipeline was successful at predicting labels for the respective data set, based on the assessed performance. In other cases, for example, mod 360 labels the meta-features with information identifying which pipeline or pipelines provided the best performance for each particular data set. A wide variety of known (or yet to be known) labelling methods and/or labelling types may be used.

The meta-features of the pipeline/data set combinations can include a wide variety of meta-features generated in a wide variety of possible ways. For example, some embodiments, including the present example embodiment, generate the meta-features using a rank correlation method. The rank correlation method may include, for example, calculating a set of rank correlations between respective sets of prediction scores generated by pipelines for particular data sets. The rank correlations may be converted into a set of vectors which may then be used as the meta-features to train the meta-learning algorithm.

In various embodiments, converting the rank correlations into vectors includes creating a vector for each pair of pipelines, where each coordinate of the vector corresponds to (e.g., is equal to) the rank correlation between that pair of pipelines and a particular data set. In various embodiments, the rank correlation is calculated based, at least in part, on the prediction scores generated by that pair of pipelines on the data set. In various embodiments, the vectors are then paired with labels based on the assessed performance, such that each coordinate has a corresponding label that identifies a particular pipeline (for example, the best performing pipeline from the assessed performance) for processing the particular data set.

Additional details regarding rank correlations and the conversion of rank correlations to meta-features can be found in the Further Comments and/or Embodiments subsection, below.

In various embodiments, a filtering method is employed to reduce the number of meta-feature vectors, resulting in a sub-set of the original set of vectors being used for the meta-features. In these embodiments, the filtering method may be combined with a predefined criterion (e.g., a minimum, a maximum, or both) for a number of desired results, generally configured to optimize performance of the system when processing new inputs. For example, as discussed below in the Further Comments and/or Embodiments subsection, the filtering method may be an entropy-based method and may be configured to produce between twenty and forty results.

Processing proceeds to operation S265, where meta-learning mod 365 trains a supervised meta-learning model using the associated performance and meta-features as training data. The meta-learning model may be any of a wide variety of meta-learning models, including, for example: (i) model-based models, including memory-augmented neural networks (MANN) and/or meta networks such as MetaNet; (ii) metric-based models, such as matching networks and/or relation networks; (iii) optimization-based models, such as long short-term memory (LSTM) meta learners, temporal discreteness models, and/or reptile networks; and/or (iv) standard machine learning techniques such as Random Forest, support vector machine (SVM), and the like. Ultimately, the meta-learning model may be any type of model configured to be trained using the meta-features and associated performance as training data.

Processing proceeds to operation S270, where meta-learning mod 365 utilizes the trained meta-learning model to identify one or more pipelines for processing the input data set. More specifically, in this embodiment, mod 365 extracts/generates meta-features from the input data set and provides the extracted meta-features as input to the trained model. The meta-features of the input data set are extracted in a similar way to the meta-features used for training: the pipelines used to generate the meta-features for the training data (i.e., the sub-set of pipelines) are identified and used to process the input data set, and the rank correlations of respective pairs of those pipelines are used to form vectors of meta-features.

In many cases, the output of the meta-learning model will be a pipeline (or list of pipelines) predicted to be the best fit for processing the input data set. In other cases, the output will be a list of pipelines with corresponding performance scores, based on the performance scores used in the training. In any event, once the meta-learning model output has been received, processing for program 300 completes, and sub-system 102 either outputs the identification of the pipeline(s) or, in some cases, outputs the result of processing the input data set using the identified pipeline.

III. Further Comments and/or Embodiments

Various embodiments of the present invention provide solutions for unsupervised, automated machine learning (AutoML). Various embodiments receive, as input, an unsupervised machine learning task—i.e., an unlabeled data set—and solve the problem of how to perform joint optimization without labels by utilizing a meta learning-based approach for unsupervised AutoML.

Figure 4:
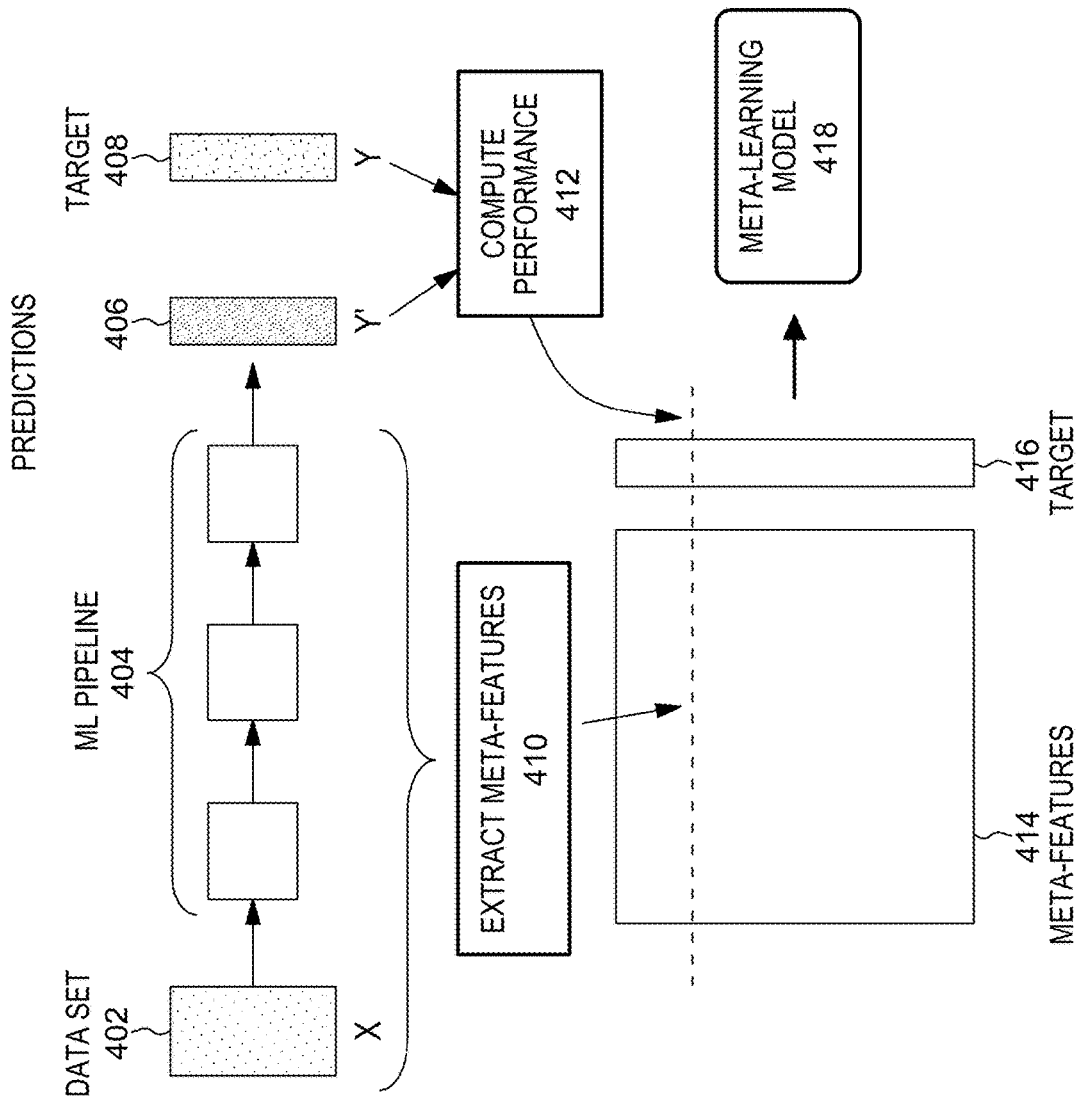
FIG. 4 is a block diagram depicting various aspects of an unsupervised AutoML solution according to an embodiment of the present invention.

FIG. 4 includes block diagram 400 depicting various aspects of an unsupervised AutoML solution according to an embodiment of the present invention. As shown in FIG. 4, meta-data generation begins by finding labeled supervised data sets (e.g., UCI, OpenML, Kaggle, and/or the like) and using those supervised data sets (e.g., data set 402) to ultimately train a meta learning model (i.e., meta-learning model 418). (Note: the terms "UCI," "OPENML," and/or "KAGGLE" may be subject to trademark rights in various jurisdictions throughout the world and are used here only in reference to the products or services properly denominated by the marks to the extent that such trademark rights may exist.) Unsupervised pipelines (e.g., pipeline 404)—pipelines that do not require labels for training—are created and used to generate predictions 406 for the supervised data sets. The performance of each data set-pipeline pair (e.g., in the form of a receiver operating characteristics (ROC) curve) is then computed (412) using predictions 406 and the data set's target labels 408, resulting in target performance 416 (i.e., the performance of the pipeline on the unsupervised data set). Meta-features are extracted (410) to capture important attributes of data set 402 and pipeline 404, resulting in meta-features 414. Meta-features 414 are then combined with target performance 416, such that a given row has meta-features and performance for a unique dataset-pipeline pair, to create an input data set for meta-learning model 418.

The meta-learning phase includes two sub-phases: training and prediction. For training, the generated metadata is used to train a supervised meta-learning model (e.g., meta-learning model 418), which causes the model to learn to predict performance given meta-features. Prediction involves: (i) extracting data set meta-features from an unsupervised data set; (ii) appending the data set meta-features to each pipeline meta-feature and predicting performance for all pipelines; and (iii) returning the predicted top-k pipelines.

In an embodiment, the meta learning-based approach for unsupervised AutoML is used to perform automated anomaly detection. In this embodiment, the user has an outlier/anomaly detection problem and no labels for training. The training data sets have labels, but the testing data sets do not have labels.

In this embodiment, processing begins (Step One) by creating a large set of unique outlier detection data sets. This is done by taking public classification data sets, performing a one-vs-all classification, down sampling the minority class, and checking for data set uniqueness.

Processing continues (Step Two) by creating a large set of unique outlier detection pipelines. In this embodiment, each pipeline has four stages: imputation, scaling, feature engineering, and estimator. Pipeline hyperparameters are set and saved for consistent experiments.

Processing continues (Step Three) by generating rank correlation meta-features, which includes executing multiple experiments in parallel (often completing millions of experiments), and computing rank correlation based meta-features using experiment meta data.

Processing continues (Step Four) by training the meta learner using the meta-features and predicting pipelines for test data sets.

More specifically, Step One includes: (i) taking classification data sets from public sources such as OpenML, Kaggle Challenges, UCI, etc.; and (ii) for each classification data set, creating multiple outlier detection data sets. This process creates many unique outlier detection data sets from a small number of classification data sets. Creating the multiple outlier detection data sets includes: (i) taking one class as the minority class, and taking all other classes and merging them as the majority class; and (ii) down-sampling the minority class to achieve the amount of contamination of the data set—i.e., the proportion of outliers in the data set. Examples of typical contaminations include 1%, 2%, 5%, 10%. For each contamination, a new outlier detection data set is created. Further, in this embodiment, when down-sampling the minority class, an outlier data point exists in only one outlier data set. This is to make sure the outlier detection data sets are unique.

Step Two includes defining the four pipeline stages (imputation, scaling, feature engineering, and estimation) and, for each stage, implementing transformers and estimators. As an example: (i) the imputation stage includes a simpler imputer and an iterative imputer; (ii) the scaling stage includes a normalizer, a min-max scaler, and a standard scaler; (ii) the feature engineering stage includes a principal component analysis (PCA) and a feature selector; and (iv) the estimation stage includes an isolation forest, one-class support vector machine (OCSVM), maximum-classifier discrepancy (MCD), and/or local outlier factor (LOF) process, and/or the like. Step Two also includes creating an outlier detection pipeline by selecting a random estimator as the final and required stage (i.e., estimation) of the pipeline, and optionally creating the other three stages by selecting at random their corresponding transformers, and potentially initializing the pipeline estimators and transformers with their parameters selected at random from their research spaces. Once the pipeline is formed and initialized, pipeline representation is defined. For example, for a pipeline, concatenation of names of the Python class of transformers and estimators and their parameters with values can make a string that uniquely identifies the pipeline, and allows for removal of duplicated pipelines so that only unique ones are used for experiments. (Note: the term "PYTHON" may be subject to trademark rights in various jurisdictions throughout the world and is used here only in reference to the products or services properly denominated by the marks to the extent that such trademark rights may exist.)

Step Three includes creating accurate meta-features. In this embodiment, there is an intuitive connection between rank correlation (RC) and the receiver operating characteristics (ROC) curve, as both depend on rank. However, a key difference is that RC can be computed on two sets of scores from two pipelines, while ROC is computed between a score and label for a single pipeline.

Figure 5:
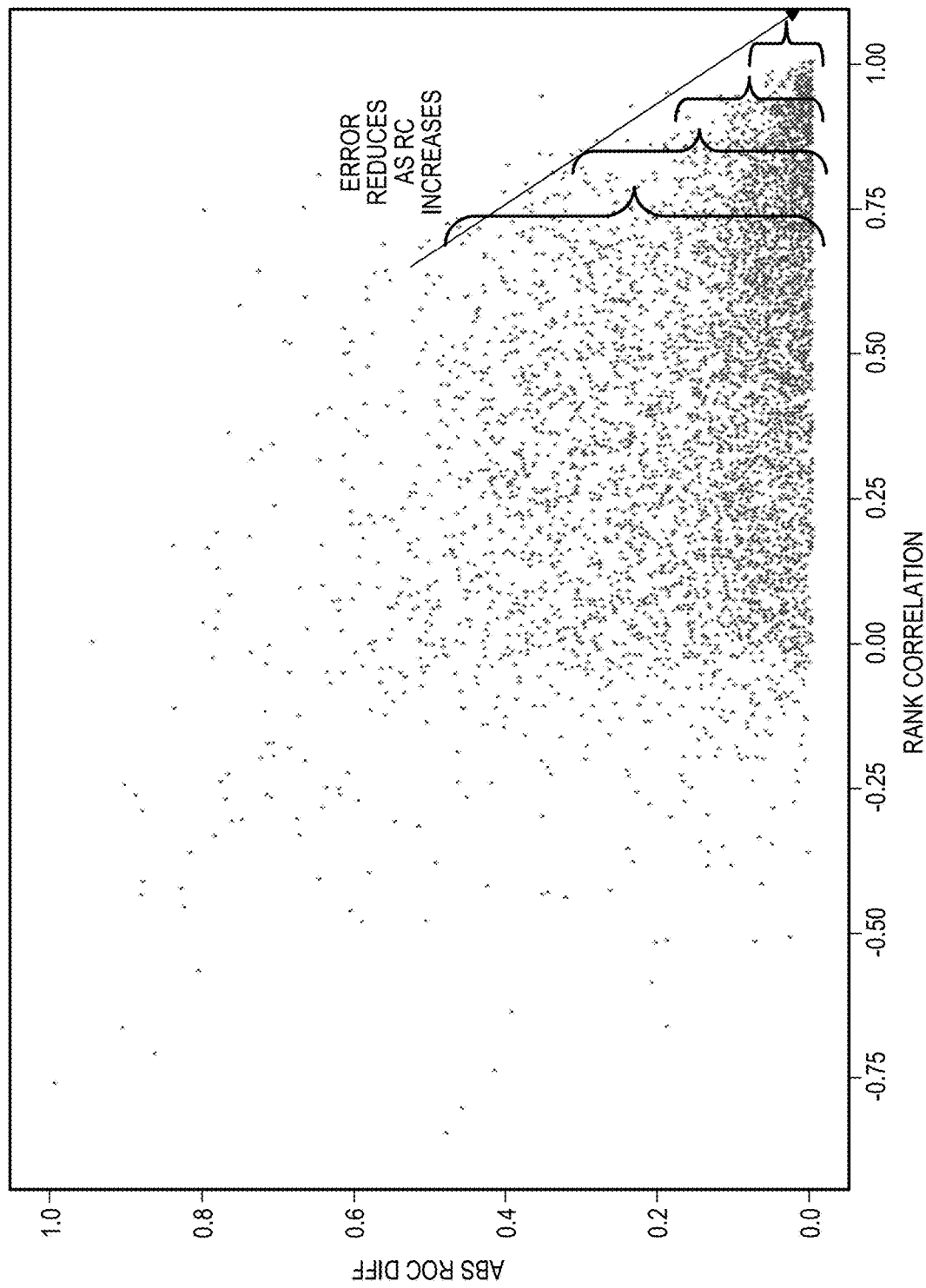
FIG. 5 is a graph view showing a relationship between a rank correlation (RC) and a receiver operating characteristics (ROC) curve for pairs of machine learning pipelines, according to an embodiment of the present invention.

FIG. 5 includes graph 500 according to the present embodiment. As shown, graph 500 plots the absolute value of the ROC difference between pairs of pipelines on the y-axis and the rank correlation between the pairs of pipelines on the x-axis, where the rank correlation generally represents pipeline similarity with respect to the data set. Given two pipelines P1 and P2 and a data set D, the ROCs obtained by the pipelines are related to the rank correlation of their scores. Also, as shown in FIG. 5, as rank correlation increases, error reduces.

Figure 6:
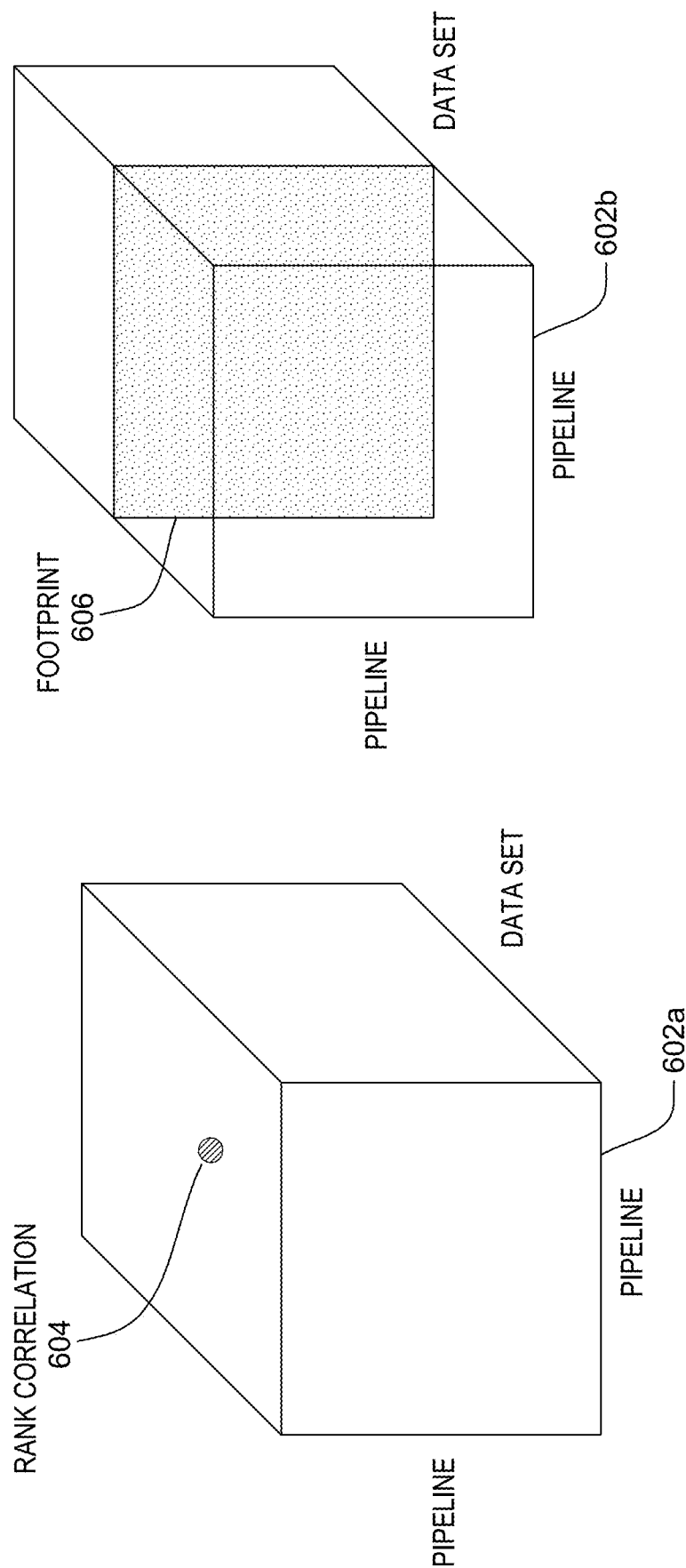
FIG. 6 is a diagram depicting tensor representations according to an embodiment of the present invention.

FIG. 6 includes diagram 600 depicting tensor representations according to the present embodiment. As shown in FIG. 6, tensors 602a and 602b have respective dimensions for two pipelines (on the x-axis and the y-axis, respectively) and the data sets (on the z-axis), where tensor 602a includes the rank correlation 604 between the two pipelines and a particular data set of the data sets, and where tensor 602b depicts the rank correlation footprint 606 of the two pipelines and a particular data set (i.e., the "slice" of tensor 602b corresponding to the data set). It should be noted that because the footprint is data set specific, similar data sets have similar footprints.

In this embodiment, the rank correlations between pairs of pipelines (in the form of rank correlation maps, i.e., tensors) are utilized in creating meta-features for particular data set-pipeline combinations, as will be discussed in further detail below.

Step Four includes using the rank correlation maps to predict the best pipelines for a data set. In this embodiment, the three-dimensional rank correlation maps are transformed into two-dimensional feature vectors that are used to train the meta-learning model.

Figure 7:
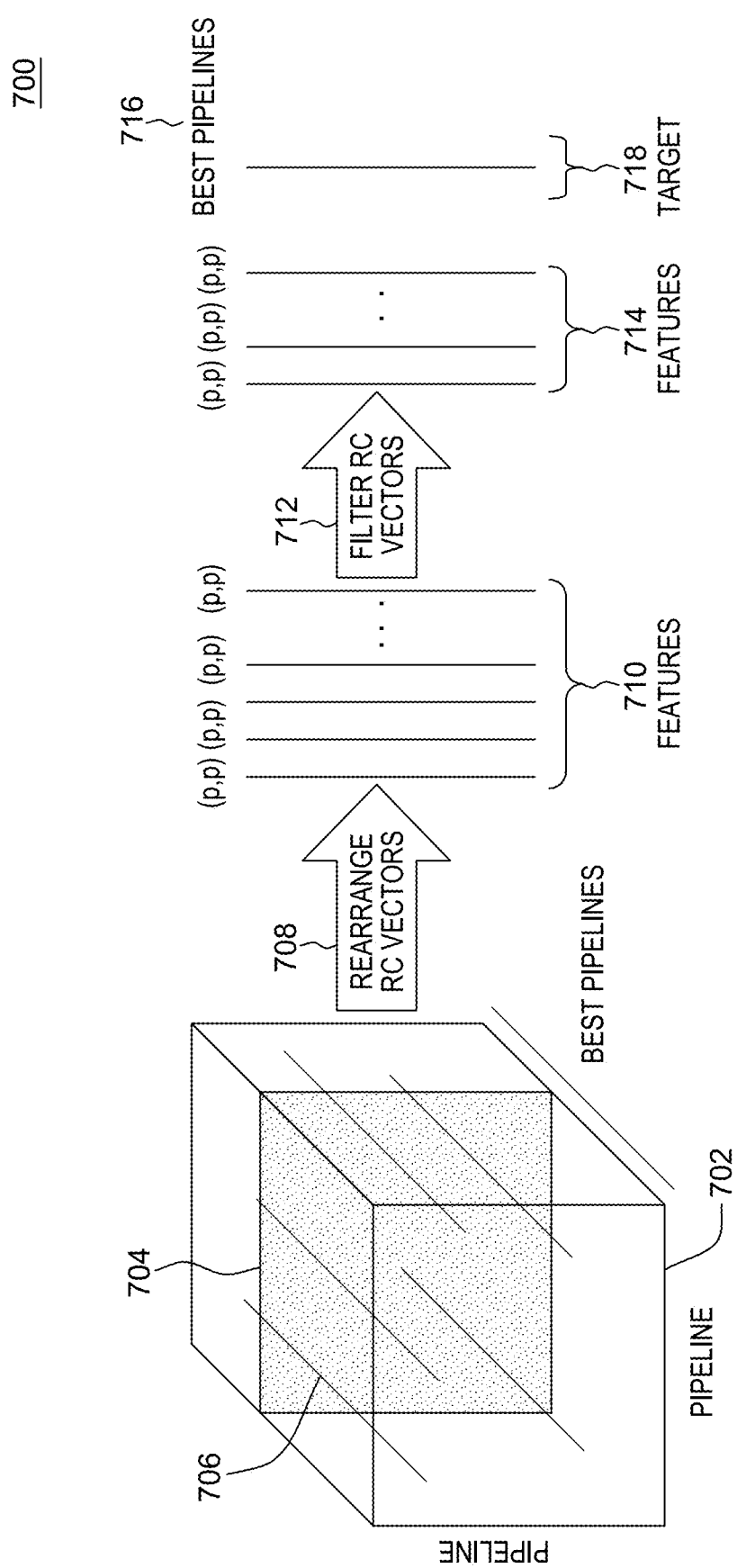
FIG. 7 is a diagram depicting tensor representation transformation according to an embodiment of the present invention.

FIG. 7 includes diagram 700 depicting a tensor representation transformation according to the present embodiment.

As shown in FIG. 7, in order to transform the rank correlation information into meta-features usable for training, the z-axis of tensor 702 is replaced with the indices of the best pipelines for the data sets. In other words, where each "slice" of tensor 602b of FIG. 6 corresponds to a data set, each "slice" of tensor 702 (e.g., footprint 704) corresponds to the best pipeline for that data set (more specifically, an index or other identifier for the best pipeline), with the best pipeline being determined from the computed performance. Thus, the rank correlations of tensor 702, which include rank correlation 706, directly incorporate information pertaining to the best pipeline for a data set.

Referring still to FIG. 7, tensor 702 is rearranged (708) from a three-dimensional tensor into two-dimensional rank correlation feature vectors (i.e., features 710), with each vector corresponding to the rank correlations of respective pairs of pipelines and the best pipelines for respective data sets. Then, in order to reduce the number of possible feature vectors—which could number in the hundreds, thousands, or more—features 710 are filtered (712) using one or more filtering criteria. For example, in this embodiment, features 710 are filtered based on entropy: the entropy of each vector is computed, and then the top-k (e.g., top 20 or top 40) vectors are selected. Another example of a possible filtering method is a boosting method—e.g., one that selects the average best pipeline and then successively selects other pipelines until pipelines for optimally processing most or all of the training data sets have been selected. The filtered feature vectors are then used as meta-features (i.e., features 714) for training the meta-learning model, with the best pipeline indices 716 used as the target/training labels (i.e., target 718).

Once training is complete, the meta-learning model is able to predict the best pipeline for a data set given that data set's meta-features. In order to obtain the meta-features of the data-set, a similar process to the one described in the previous paragraph is employed: (i) each pipeline corresponding to a feature vector of the filtered feature vectors (features 714) is executed on the data set; and (ii) the rank correlations of the pairs of pipelines represented by the filtered feature vectors (features 714) with respect to the data set are calculated and used as the meta-features for the data set. In other words, in Step 4, a sub-set of pipelines were identified, via the filtering (712) step, as being ideally suited for processing a wide range of data sets. This sub-set of pipelines is used to obtain meta-features for the input data set, which when provided to the trained meta-learning model produce a prediction for the overall best pipeline to process the data set.

FIG. 8 includes table view 800 depicting experimental data according to the present embodiment. As shown in FIG. 8, table 802 includes details about the meta-learning data set, including number of data sets, number of pipelines, number of experiments, and sparsity ratio. Table 804 compares various regret and median ROC values for each of four different approaches, including a random approach, an average best pipeline approach, a meta outlier detection approach, and OPTUS (the approach employed by the present embodiment). As shown, the present approach results in the best regret value, where lower is better, and the best median ROC value, where higher is better. The Median Oracle Best for these experiments, where the best pipeline of the available pipelines (e.g., the best pipeline of a set of 10,000 pipelines) is selected for a particular input data set, is 86.68%. The Median Single Pipeline Best, where the pipeline that performs the overall best across the entire set of pipelines on an entire set of data sets (e.g., a set of 1,000 data sets) is selected, is 70.33%.

Various embodiments of the present invention include one, or more, of the following features, characteristics and/or advantages: (i) an order of magnitude of speedup, in comparison to existing evaluation-based methods for supervised AutoML; (ii) full automation, leveraging supervised data sets to build a meta learner for unsupervised data sets; (iii) scalability, where newer data sets and meta data can be easily incorporated into the meta learner; and/or (iv) extensibility, providing support for numerous unsupervised ML tasks, including outlier detection, data clustering, novelty detection, and semi-supervised learning.

Various embodiments of the present invention predict the optimal machine learning pipeline for a particular unsupervised data set based on meta features of the data set. This differs from, and improves upon, existing methods that focus on analyzing/combining results from multiple pipelines, or on training fixed pipelines that are used for all data sets (as opposed to specific pipelines for specific data sets). Various embodiments also build a rank correlation map of performance metrics obtained from pipelines on training data sets, and build a predictive model using this pipeline performance data to predict the best pipelines for the input data sets (i.e., the pipelines that can best detect anomalous data points in the input data sets), improving over methods that simply match data sets to pipelines from a corpus.

Various embodiments of the present invention recognize that in supervised learning, it is well-understood that finding optimal pipelines is a formidable challenge: it requires searching through large numbers of configurations and hyperparameters of data transformers and estimators to form the resulting ranking of the pipelines. It is even more challenging to find optimal pipelines in outlier detection because there is no data label to guide the pipeline search process.

Various embodiments of the present invention recognize that the inputs of an AutoML system include one data set and a very large number of possible machine learning pipelines. The system has to output the optimal pipeline for the input data set in a short time window. In supervised learning, data sets have data labels that can be used by an internal search algorithm to guide the pipeline search and hyperparameter optimization to find the top performing pipelines. In unsupervised learning, however, data labels do not exist, and no data points in the input data set have the label of "normal" or "anomalous," so the pipeline search and hyperparameter tuning cannot be done as in supervised learning.

Various embodiments of the present invention further recognize that there is no such AutoML system or product that can automatically and effectively produce optimal pipelines for input outlier detection data sets in the current literature.

As such, various embodiments of the present invention provide a meta-learning based algorithm that can produce optimal pipelines for input outlier data sets by building a 3-dimensional rank correlation map data structure that captures the correlation of performance among pipelines. This rank correlation map is then converted into a 2-dimensional tabular form used to train a predictive model that predicts the best pipelines for an input outlier detection data set.

In various embodiments, while prediction of optimal pipelines for input outlier data sets are typically performed online (in real-time), the rank correlation map data structure and the predictive model can be built offline. That is, various embodiments build millions of models from thousands of pipelines and tens of thousands of outlier data sets and collect the performance meta data of these pipelines on these data sets. This performance meta data then is used to construct a rank correlation map and build a predictive model (or the meta learner) that provides prediction of optimal pipelines for newly unseen outlier detection data sets.

Various embodiments of the present invention: (i) outperform state of the art methods such as MetaOD; (ii) can be used for anomaly/outlier detection in various AutoAI environments; and/or (iii) can be used to extend existing AutoAI for supervised learning, by finding the initial set of high-quality ML pipeline candidates that can be further evaluated by the core engine of AutoAI.

Various embodiments of the present invention provide: (i) a system and method for automated unsupervised outlier detection using rank correlation maps and meta-learning; (ii) a system and method that uses meta-learning for learning an automated machine learning approach for unsupervised outlier detection; and/or (iii) a meta-learning system that learns to predict the machine learning pipelines for a given data sets using the features generated by the rank correlation maps.

Various embodiments of the present invention further provide: (i) a system that can be used to train a meta learner for any unsupervised machine learning task; (ii) a machine learning pipeline that is a set of machine learning stages (or steps) culminating in a machine learning estimator; (iii) defining rank correlation as a statistical measure that measures correlation between the ranks of any two lists that can be ordered; and/or (iv) measuring the rank correlation using Spearman's Rho, Kendal's Tau, or any such similar metric.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   assessing a performance of a plurality of unsupervised machine learning pipelines against a plurality of data sets;
   associating the performance with meta-features corresponding to respective pipeline/data set combinations;
   training a supervised meta-learning model using the associated performance and meta-features as training data; and
   utilizing the trained model to identify one or more pipelines for processing an input data set.

2. The computer-implemented method of claim 1, wherein the pipelines of the plurality of unsupervised machine learning pipelines are configured to identify outliers in data sets.

3. The computer-implemented method of claim 2, further comprising utilizing the identified one or more pipelines for processing the input data set to identify outliers in the input data set.

4. The computer-implemented method of claim 1, further comprising generating the meta-features corresponding to the respective pipeline/data set combinations utilizing a rank correlation method.

5. The computer-implemented method of claim 4, wherein the rank correlation method includes:
   calculating a set of rank correlations between respective pairs of pipelines for particular data sets;
   converting the set of rank correlations into a set of vectors; and
   utilizing a sub-set of the set of vectors as the meta-features corresponding to the respective pipeline/data set combinations.

6. The computer-implemented method of claim 5, wherein:
   a vector of the set of vectors corresponds to a particular pair of pipelines; and
   a coordinate of the vector corresponds to a rank correlation between the particular pair of pipelines and a particular data set of the particular data sets.

7. The computer-implemented method of claim 6, wherein associating the performance with the meta-features corresponding to the respective pipeline/data set combinations includes, for the coordinate of the vector, associating a label that identifies a particular pipeline for processing the particular data set, the particular pipeline selected based, at least in part, on the assessed performance.

8. The computer-implemented method of claim 5, wherein utilizing the trained model to identify the one or more pipelines for processing the input data set includes:
   identifying a sub-set of pipelines corresponding to the sub-set of vectors;
   generating meta-features for the input data set utilizing rank correlations of respective pairs of pipelines of the sub-set of pipelines; and
   providing the generated meta-features for the input data set as input to the trained model.

9. The computer-implemented method of claim 5, further comprising identifying the sub-set of the set of vectors based, at least in part, on: (i) a filtering method, and (ii) a desired number of results.

10. The computer-implemented method of claim 1, wherein the assessed performance includes a receiver operating characteristics (ROC) curve.

11. The computer-implemented method of claim 1, wherein the pipelines of the plurality of unsupervised machine learning pipelines respectively include multiple stages of machine learning processing culminating in a machine learning estimation stage.

12. The computer-implemented method of claim 1, wherein assessing the performance of the plurality of unsupervised machine learning pipelines against the plurality of data sets includes:
identifying the plurality of data sets from a repository of labeled data sets, the data sets of the plurality of data sets including data and corresponding labels for the data;
identifying the plurality of unsupervised machine learning pipelines from a repository of unsupervised machine learning pipelines;
processing the plurality of data sets utilizing the plurality of unsupervised machine learning pipelines to generate predictions corresponding to the data of the plurality of data sets; and
comparing the predictions to the labels for the data of the plurality of data sets.

13. A computer program product comprising one or more computer readable storage media and program instructions collectively stored on the one or more computer readable storage media, the program instructions including instructions to:
assess a performance of a plurality of unsupervised machine learning pipelines against a plurality of data sets;
associate the performance with meta-features corresponding to respective pipeline/data set combinations;
train a supervised meta-learning model using the associated performance and meta-features as training data; and
utilize the trained model to identify one or more pipelines for processing an input data set.

14. The computer program product of claim 13, wherein the program instructions further comprise instructions to generate the meta-features corresponding to the respective pipeline/data set combinations utilizing a rank correlation method.

15. The computer program product of claim 14, wherein the rank correlation method includes:
calculating a set of rank correlations between respective pairs of pipelines for particular data sets;
converting the set of rank correlations into a set of vectors; and
utilizing a sub-set of the set of vectors as the meta-features corresponding to the respective pipeline/data set combinations.

16. The computer program product of claim 15, wherein:
a vector of the set of vectors corresponds to a particular pair of pipelines; and
a coordinate of the vector corresponds to a rank correlation between the particular pair of pipelines and a particular data set of the particular data sets.

17. A computer system comprising:
one or more computer processors; and
one or more computer readable storage media;
wherein:
the one or more computer processors are structured, located, connected and/or programmed to execute program instructions collectively stored on the one or more computer readable storage media; and
the program instructions, when executed by the one or more computer processors, cause the one or more computer processors to perform a method comprising:
assessing a performance of a plurality of unsupervised machine learning pipelines against a plurality of data sets;
associating the performance with meta-features corresponding to respective pipeline/data set combinations;
training a supervised meta-learning model using the associated performance and meta-features as training data; and
utilizing the trained model to identify one or more pipelines for processing an input data set.

18. The computer system of claim 17, wherein the method further comprises generating the meta-features corresponding to the respective pipeline/data set combinations utilizing a rank correlation method.

19. The computer system of claim 18, wherein the rank correlation method includes:
calculating a set of rank correlations between respective pairs of pipelines for particular data sets;
converting the set of rank correlations into a set of vectors; and
utilizing a sub-set of the set of vectors as the meta-features corresponding to the respective pipeline/data set combinations.

20. The computer system of claim 19, wherein:
a vector of the set of vectors corresponds to a particular pair of pipelines; and
a coordinate of the vector corresponds to a rank correlation between the particular pair of pipelines and a particular data set of the particular data sets.

* * * * *